US008318406B2

(12) United States Patent
Goldstein

(10) Patent No.: US 8,318,406 B2
(45) Date of Patent: Nov. 27, 2012

(54) METHOD FOR FIXING A FLEXOGRAPHIC PLATE

(75) Inventor: Kobi Goldstein, Lapid (IL)

(73) Assignee: Eastman Kodak Company, Rochester, NY (US)

( * ) Notice: Subject to any disclaimer, the term of this patent is extended or adjusted under 35 U.S.C. 154(b) by 381 days.

(21) Appl. No.: 12/699,079

(22) Filed: Feb. 3, 2010

(65) Prior Publication Data

US 2011/0189612 A1 Aug. 4, 2011

(51) Int. Cl.
*G06F 7/26* (2006.01)
*B41N 1/08* (2006.01)

(52) U.S. Cl. ...... 430/302; 430/300; 101/453; 101/463.1

(58) Field of Classification Search .................. 430/300, 430/302; 101/453, 463.1
See application file for complete search history.

(56) References Cited

U.S. PATENT DOCUMENTS 4,547,454 A * 10/1985 Hoffmann et al. ............ 430/371
6,228,464 B1 * 5/2001 Miyaji ........................ 428/195.1

FOREIGN PATENT DOCUMENTS

EP 1 155 871 A2 11/2001
WO WO 2009/097092 A1 8/2009

* cited by examiner

*Primary Examiner* — Anca Eoff
(74) *Attorney, Agent, or Firm* — Nelson Adrian Blish

(57) ABSTRACT

A method includes removing the previously imaged area (120) from the flexographic plate (104) to create an opening in the flexographic plate; providing a portion (108) from a flexographic plate built from similar material of the previously imaged flexographic plate; adding adhesive material (116) to the portion or to the opening or to the portion and to the opening; placing the opening within the portion; curing the adhesive material to permanently fix the portion to the flexographic plate; polishing the top (508) of the portion to match to the top surface (504) of the flexographic plate; and imaging the portion.

11 Claims, 9 Drawing Sheets

METHOD FOR FIXING A FLEXOGRAPHIC PLATE

CROSS REFERENCE TO RELATED APPLICATIONS

Reference is made to commonly-assigned U.S. patent application Ser. No. 12/020,616 (now U.S. Patent Publication No. 2009/0191333), filed Jan. 28, 2008, entitled METHOD FOR PROVIDING OR CORRECTING A FLEXOGRAPHIC PRINTING PLATE, SLEEVE OR PRECURSOR THEREOF, by Pinto et al., the disclosure of which is incorporated herein.

FIELD OF THE INVENTION

This invention relates to flexography. In particular, it relates to a method of correcting or providing additional image areas on already laser-engraved flexographic printing plates or sleeves.

BACKGROUND OF THE INVENTION

Flexographic printing plates are known for printing images on surfaces that are either rough (for example, corrugated) or smooth, such as packaging materials, plastic films, wallpaper, and fabrics. The process has mainly been used in the packaging industry where the plates should be sufficiently flexible and the contact sufficiently gentle to print on uneven substrates such as corrugated cardboard as well as flexible materials such as polypropylene film. For flexographic printing, a flexible plate with a relief image is usually wrapped around a cylinder and its relief image is inked up and the ink is then transferred to a suitable printable medium. In order to accommodate the various types of printing media, the flexographic plates should have a rubbery or elastomeric nature whose precise properties can be adjusted for each particular printable medium.

The flexographic printing plate may be prepared by exposing the UV sensitive polymer layer of the plate through a mask in the form of a negative film. The process involves a number of other stages such as a back UV exposure before imaging, a solvent or thermal development stage and heating and further UV exposures. For the purposes of the present invention as described below, flexographic plate imaging using a negative film through which the plate is UV exposed and further treated will be termed the "conventional process." This will distinguish it from digital imaging that may include LAMS (laser ablated mask) and direct engraving.

In addition, radiation-sensitive elements having a laser-ablatable element integral to the surface are also known in the art. A relief image can be produced in such elements without the use of a digital negative image or other imaged element or masking device. Also, films with a laser-ablatable mask layer can be formed by first imagewise exposing the film with laser radiation (generally an infrared radiation laser under computer control) to selectively remove the mask layer in the exposed areas.

The masking film is then placed in contact with a radiation-sensitive element and subjected to overall exposure with actinic radiation (for example, UV radiation) to cure the radiation sensitive element in the unmasked areas and thus form a negative image of the mask in the element. The film containing the mask layer and the imaged radiation-sensitive element (such as an imaged printing plate precursor) are then subjected to solvent development. The unexposed printing plate areas and the mask layer are completely developed off, and after drying, the resulting imaged element is useful, for example as a flexographic printing plate.

A simpler way of making a flexographic printing plate is by direct engraving using laser beam ablation, thereby eliminating all need for washing or drying the plate or multiple types of exposure.

Once a plate has been imaged by any of the above methods, there is very little that can be done if an error has crept in to the process or the plate that has been prepared for printing needs correction in any way and it is then necessary to prepare another plate by the long processes of exposure and development as described above.

Conventionally imaged flexographic plates are generally imaged flat by placing them in a vacuum frame with the negative film in contact. The finished elastomeric plate will then have to be wrapped around the cylinder of the printing press and this results in distortion of the image. Some distortion factor formulae exist for modifying the exposure of the negative to correct for distortion, but such methods are inexact. The process of correction is known as "dispro."

Similarly, where a LAMS plate is imaged on a drum using a laser, ablation occurs and the flexographic plate is then UV-exposed frequently in the flat form and the finished plate is eventually put on the printing press cylinder of a different diameter to the exposure system some image distortion can easily be introduced. In order to avoid this type of distortion, it is possible to image and print on a sleeve that both fits into the imaging system and the printing system. This way the flexographic element is not removed and repositioned during the entire process from before imaging to after printing. This method does not lend itself to conventional exposure where a vacuum would have to be exerted in the round. But it does lend itself to both LAMS and direct engraving.

One method for using sleeves is known as plate-on-sleeve. The precursor plate is bonded to an inert sleeve shell and it can then be imaged and further processed without removal from the shell. The most advantageous method in many respects is where the customer receives the sleeve coated with a seamless flexographic plate precursor that can then be imaged and treated and used for printing. Such a method commends itself as several sleeves can have color separated images accurately positioned for preparation of color prints where the colors must be printed accurately one on top of another. This saves the printer considerable time and effort in setting up the print cylinders to produce the same accurate register effect. Also, seamless sleeves can be used to produce an endless continuous pattern. Even where there is a repeat pattern, wastage of material corresponding to the unprintable seam area of the plate can be saved by using a seamless sleeve. Seamless sleeve flexographic plates can be used for printing at faster printing speeds than plates or plates-on-sleeve because at fast speeds flexographic plates that are bonded to the cylinders so that they can subsequently be removed tend to lift off at the edges when used too fast. A disadvantage of seamless sleeves is that they are generally more expensive than other types of flexographic printing plate precursors and the storage of sleeves requires more space than flat printing plates.

In recent years, the quality of flexographic prints (impressions) has improved markedly, but a significant obstacle to flexography gaining a greater share of the print market is the cost of the flexographic printing precursor, whether it is a printing plate precursor or printing sleeve precursor. The precursor may be purchased by either a trade shop that prepares the printable flexographic plate or sleeve for a printer to use or it may be purchased directly by the printer. At this point the plate is imaged by a computer-to-plate (CTP) device. In the case where an error is detected in the content of the imaged plate, then it becomes unusable, the trade shop or printer (or the user) has to absorb the cost (loss). In cases where the imaged plate could adequately be repaired for use it would be a considerable advantage.

SUMMARY OF THE INVENTION

Briefly, according to one aspect of the present invention is a method for correcting a previously imaged area on a flexographic plate. The method includes removing the previously imaged area from the flexographic plate to create an opening in the flexographic plate; providing a portion from a flexographic plate built from similar material of the previously imaged flexographic plate; adding adhesive material to the portion or to the opening or to the portion and to the opening; placing the opening within the portion; curing the adhesive material to permanently fix the portion to the flexographic plate; polishing the top of the portion to match to the top surface of the flexographic plate; and imaging the portion. The invention and its objects and advantages will become more apparent in the detailed description of the preferred embodiment presented below.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings wherein.

DETAILED DESCRIPTION OF THE INVENTION

Unless otherwise indicated, the term "uncured laser-engraveable composition" refers to the uncured composition used in the methods of this invention and that is applied to the various precursors or laser-engraved elements. This composition can be in liquid or paste form. In all instances, once cured, the composition can be laser-engraved or printed.

By "ablative," "laser-engraveable," or "printed," it is meant that the applied laser-engraveable composition portions can be imaged using a thermal ablating means such as laser radiation that causes rapid local changes in the applied portions thereby causing the component material(s) in the applied portions to be ejected from the surface. The term "blank" is used in this application to describe a non-imaged printing plate (or printing plate precursor or sleeve precursor).

Unless otherwise indicated, the term "laser-engraveable flexographic printing precursor" refers to laser-engraveable elements prior to imaging. This term includes both "laser-engraveable flexographic printing plate precursors" that are generally flat imageable elements, as well as "laser-engraveable flexographic printing sleeve precursors" that are generally circular imageable elements that are fitted or slid onto a printing cylinder. The term "laser-engraved flexographic printing plate" refers to the already-imaged flexographic printing plate precursors that can then be used for printing. The term "laser-engraved flexographic printing sleeve" refers to the already-imaged flexographic printing sleeve precursor that can be used for printing.

Figure 1:
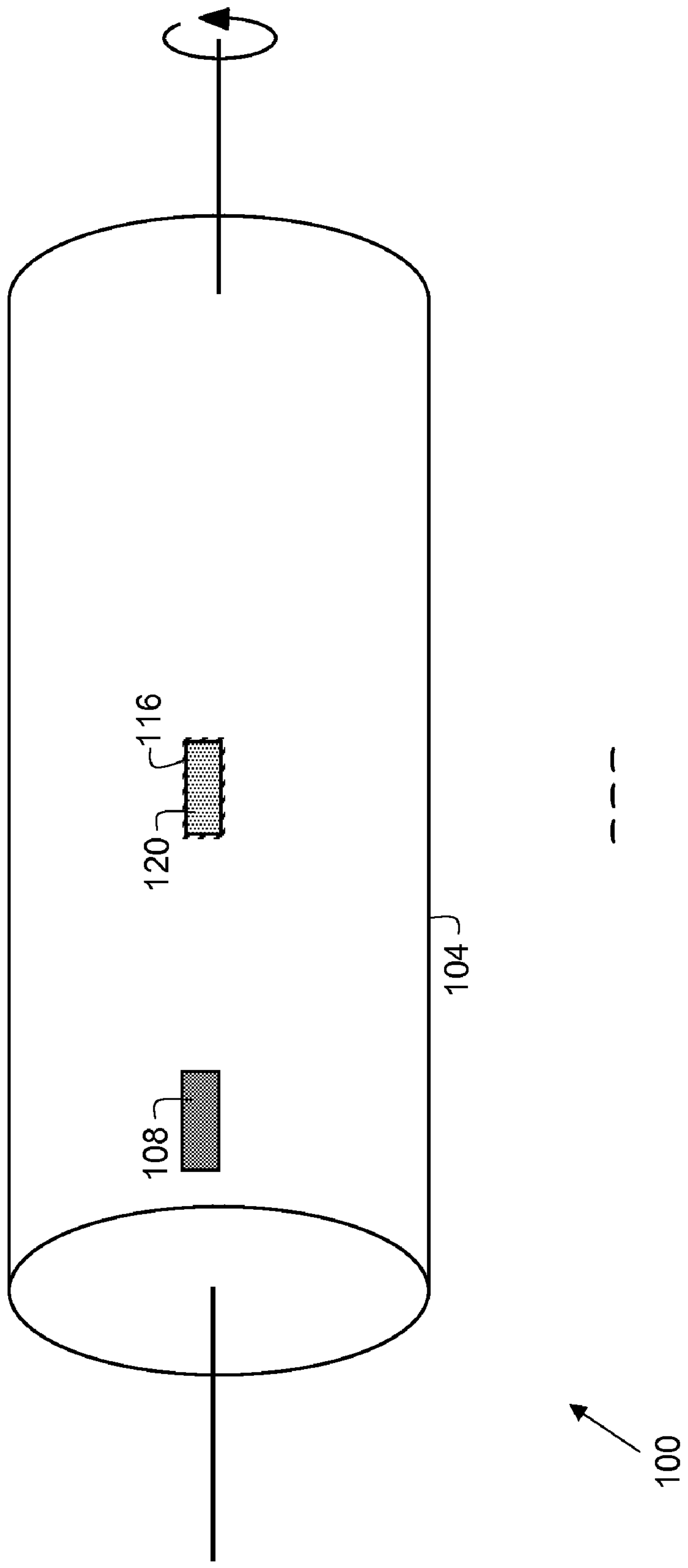
FIG. 1 is a schematic illustration a flexographic plate mounted on a rotating drum, the previously imaged areas.

FIG. 1 shows a rotation drum 100 typically installed on a computer-to-plate (CTP) device. A plate or a sleeve 104 is mounted on rotation drum 100 for laser imaging. FIG. 1 shows an illustration of an extracted non-imaged portion 108 from plate 104, it can be alternatively extracted from another plate with similar characteristics. The extracted portion 108 is placed into a previously removed imaged area 120 from plate 104. Prior to placing portion 108 into removed area 120, at least one of the elements 108 and 120, are applied with adhesive element 116. The adhesive material that can be used maybe double-sided adhesive such as DuploFlex 3 or DuploFlex 4 from Lohman. Other adhesive material are such as Terostat-MS 939 from Teroson, 3M 4799, 3M 1300, Ergo 5880 and Ergo 5300 from Kisling.

Figure 2:
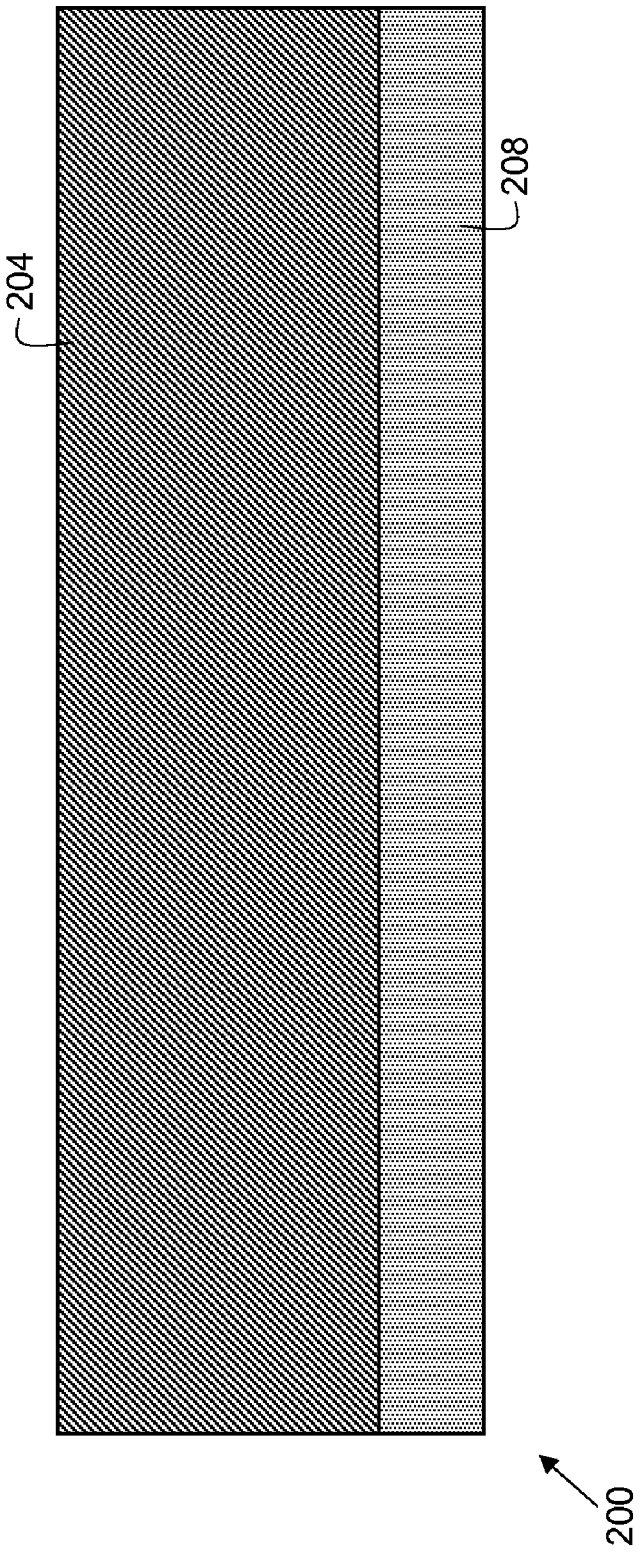
FIG. 2 is a schematic illustration of a non-imaged flexographic plate surface.

FIG. 2 shows a cross-sectional view of a non-imaged plate or sleeve precursor 200 (such as plate 104), illustrating a sample of possible layers configuration that precursor 200 may be constructed from. Imaging layer 204, is constructed from ablative material, by applied thermal energy, such as emission of laser energy on imaging layer 204. Imaging layer 204 is usually attached on a support layer 208, to form a mechanically sound precursor.

Figure 3:
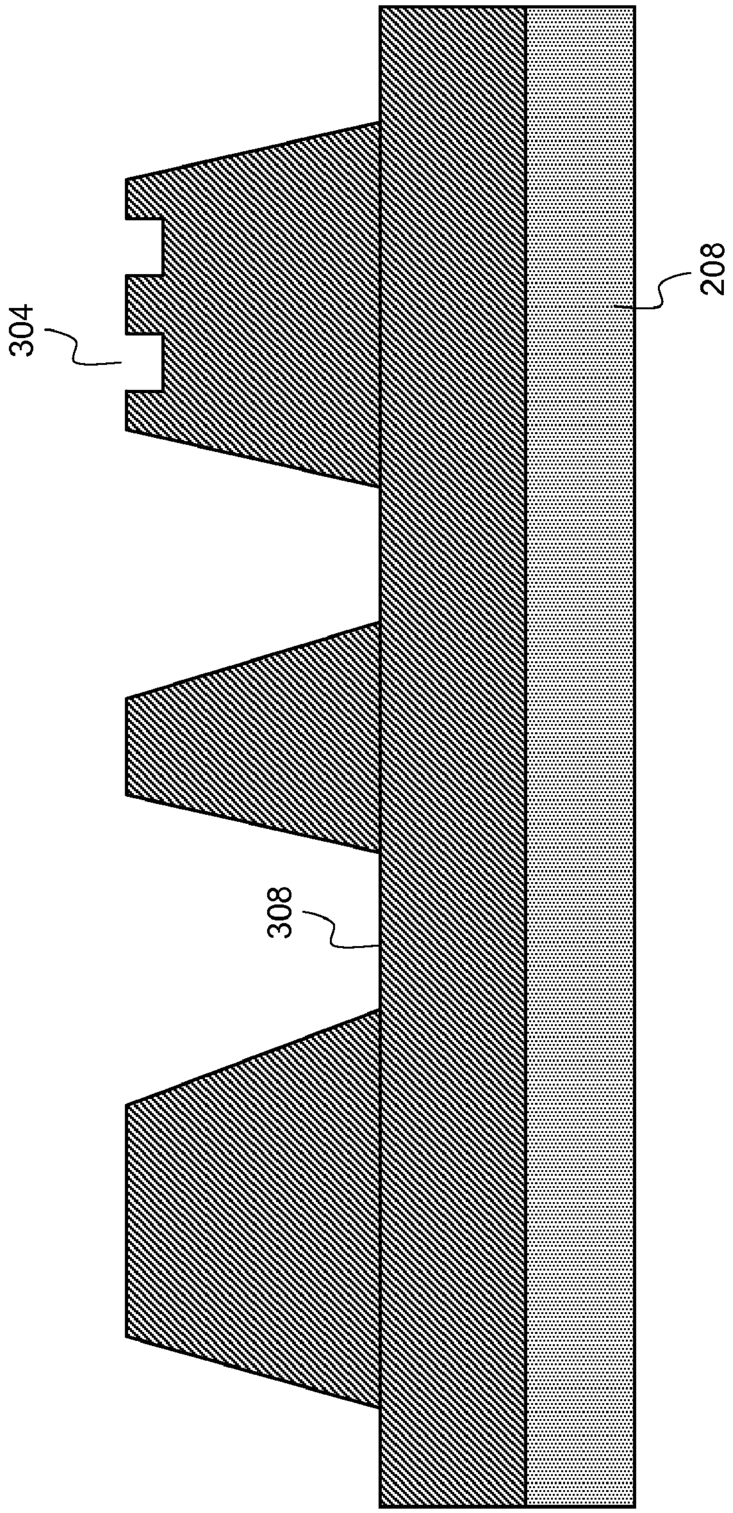
FIG. 3 is a schematic illustration of an imaged flexographic plate.

FIG. 3 shows a cross-sectional view of an imaged plate (or sleeve) 104. Area 304 shows an imageable portion of plate 104. Imageable area 304 is configured to transfer ink from plate 104 into a printable substrate (such as paper or plastic material) when it is installed on a printing press. Area 308 represents a non-imageable area (no ink transfer area), area 308 shows a deep relief into plate 104, and as such, ink will not transfer from non-imageable area 308 onto substrate when plate 104 is used during printing press operation.

A correction of imaged plate 104 is often needed, the need for a correction may stem from variety of reasons. A minor correction (in terms of affected plate area) may be, for example, a typo mistake that is found on an imaged plate. Having the ability to correct such mistakes, provided that the cost of a repair is less than a production of a new corrected plate, is very important.

Another similar treatment of small imaged areas of a previously imaged plate may originate from the need to produce plates which are slightly different. This need can serve the variable information market, or more specifically regional printing requirements. An example for regional printing can be an advertisement piece for a franchise food store chain, that the only difference between the plates will be the address of a specific food store.

Figure 4:
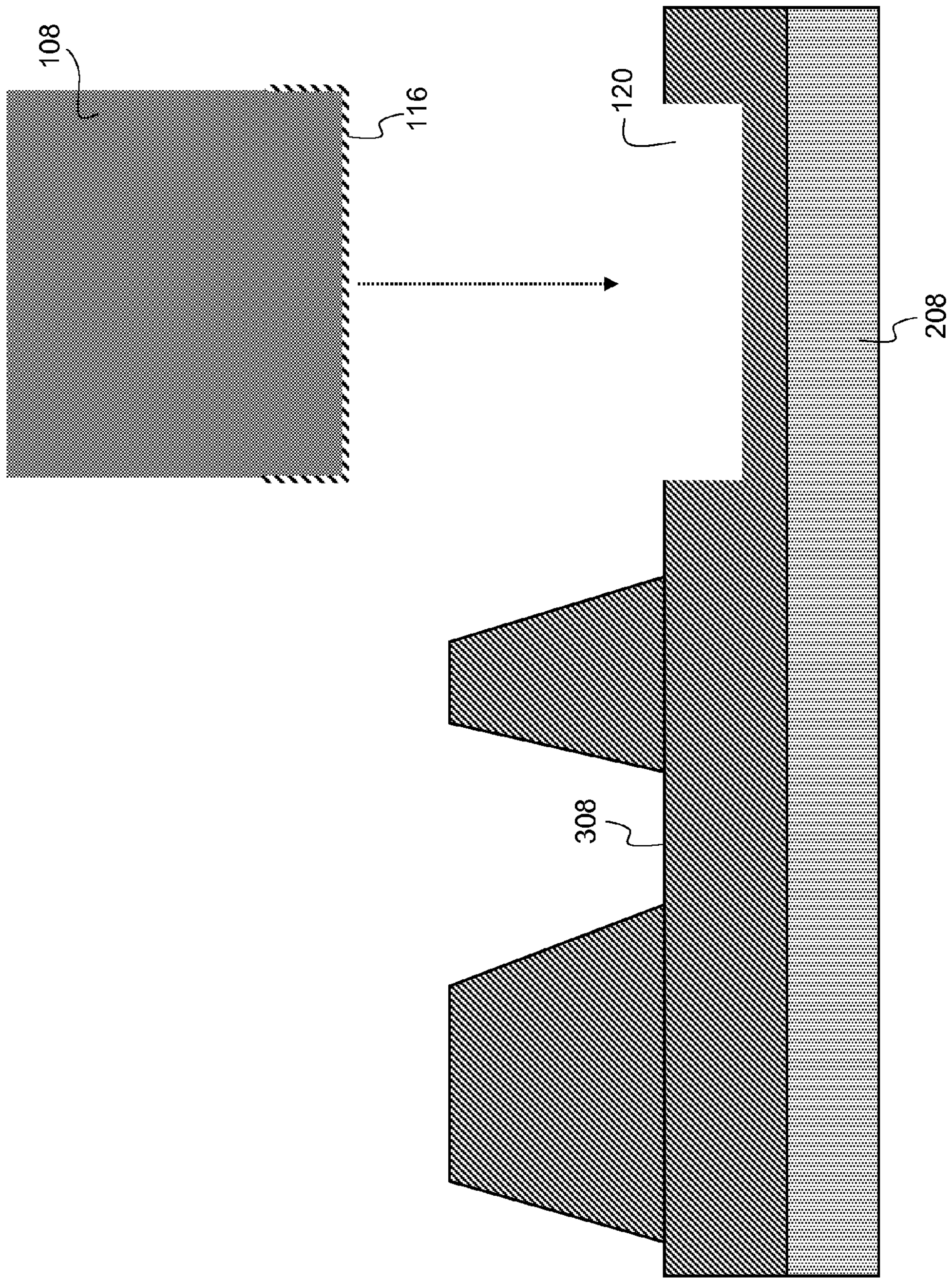
FIG. 4 is a schematic illustration of an area of an imaged flexographic plate to be removed and replaced by a plate patch.

For such slight differences between plates, just a small area of the plate can be replaced. FIG. 3 shows imaged area 304 that will be replaced by extracted plate portion 108 (FIG. 4). Plate portion 108 as was indicated earlier is made from same material as is plate 104. Image area 304 is removed to create a removed area 120. Plate portion 108 will be placed in removed area 120 and will be fixed into plate 104 by adhesive material 116. The adhesive material will applied at least inside area 120 or/and around portion 108. The adhesive material can be double sided, or constructed from a dual component adhesive material, or from a heat activated material which maybe activated by laser power. Both portion 108 and removed area 120 can be created by applying laser power.

Figure 5:
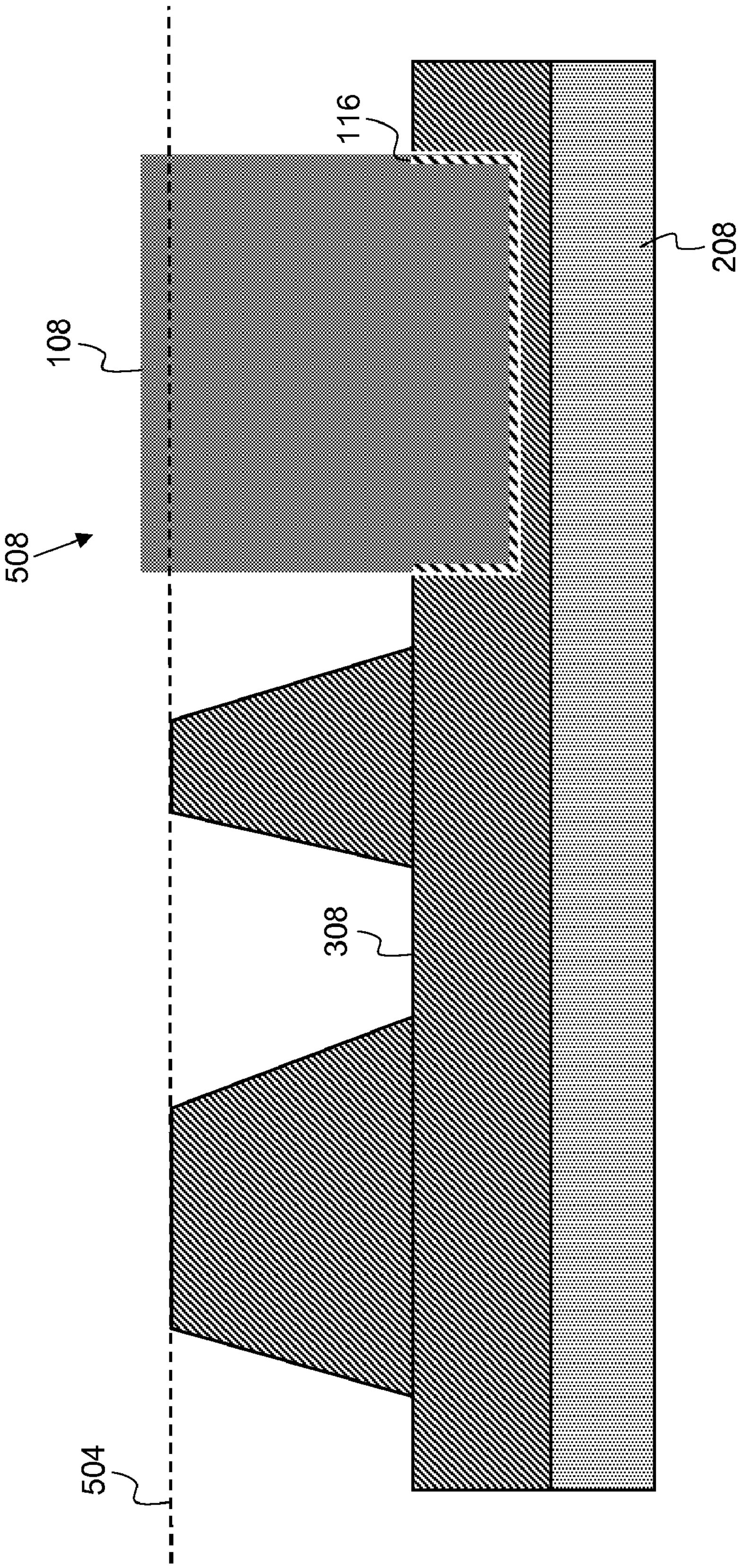
FIG. 5 is a schematic illustration of a plate patch attached to an imaged flexographic plate to be polished for further reimaging.

FIG. 5 shows plate portion 508, the top portion of inserted area 108 is higher than top 504 (of plate 104). The height of the flexographic plate is determined and portion 508 is polished to that height. One method of polishing is by applying laser power to align it with the height of the top surface of plate 104 (as is indicated by numeral 504).

Figure 6:
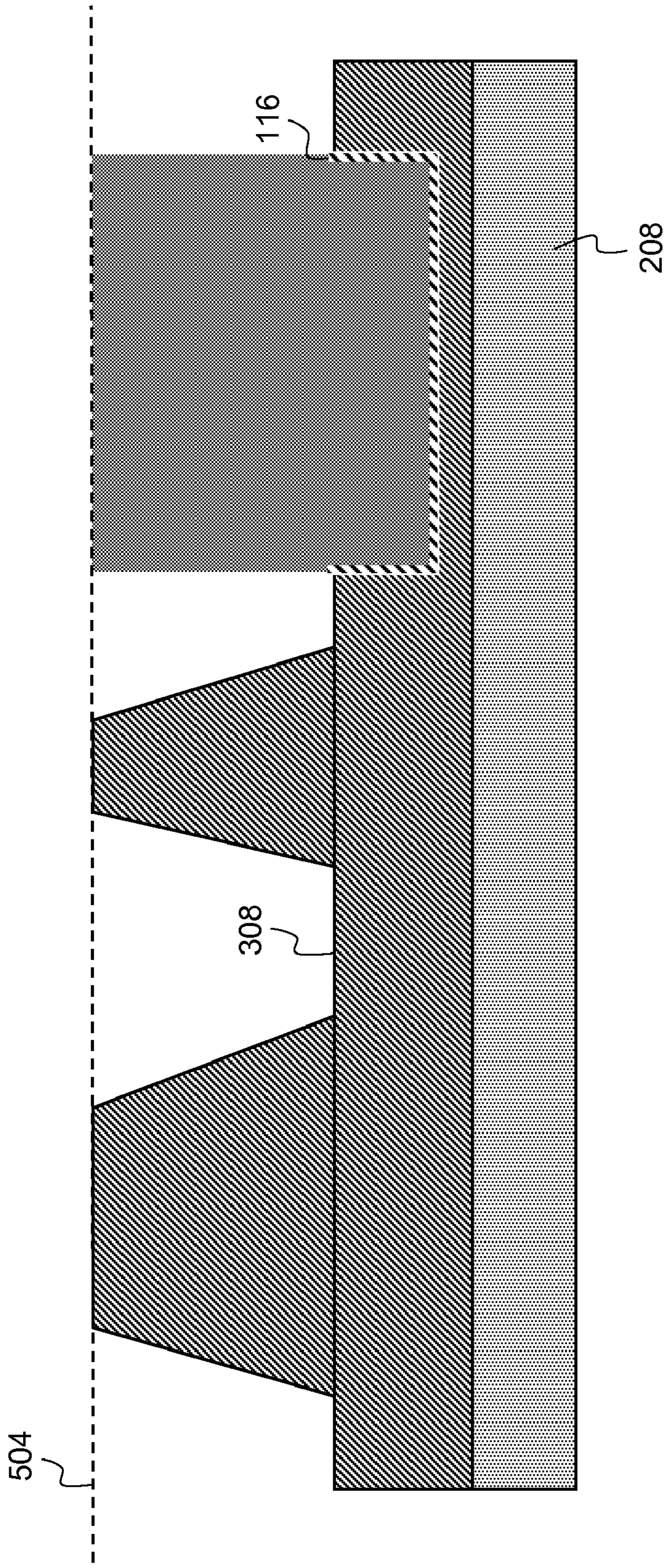
FIG. 6 is a schematic illustration of a patch attached to an imaged flexographic plate ready for further reimaging.
Figure 7:
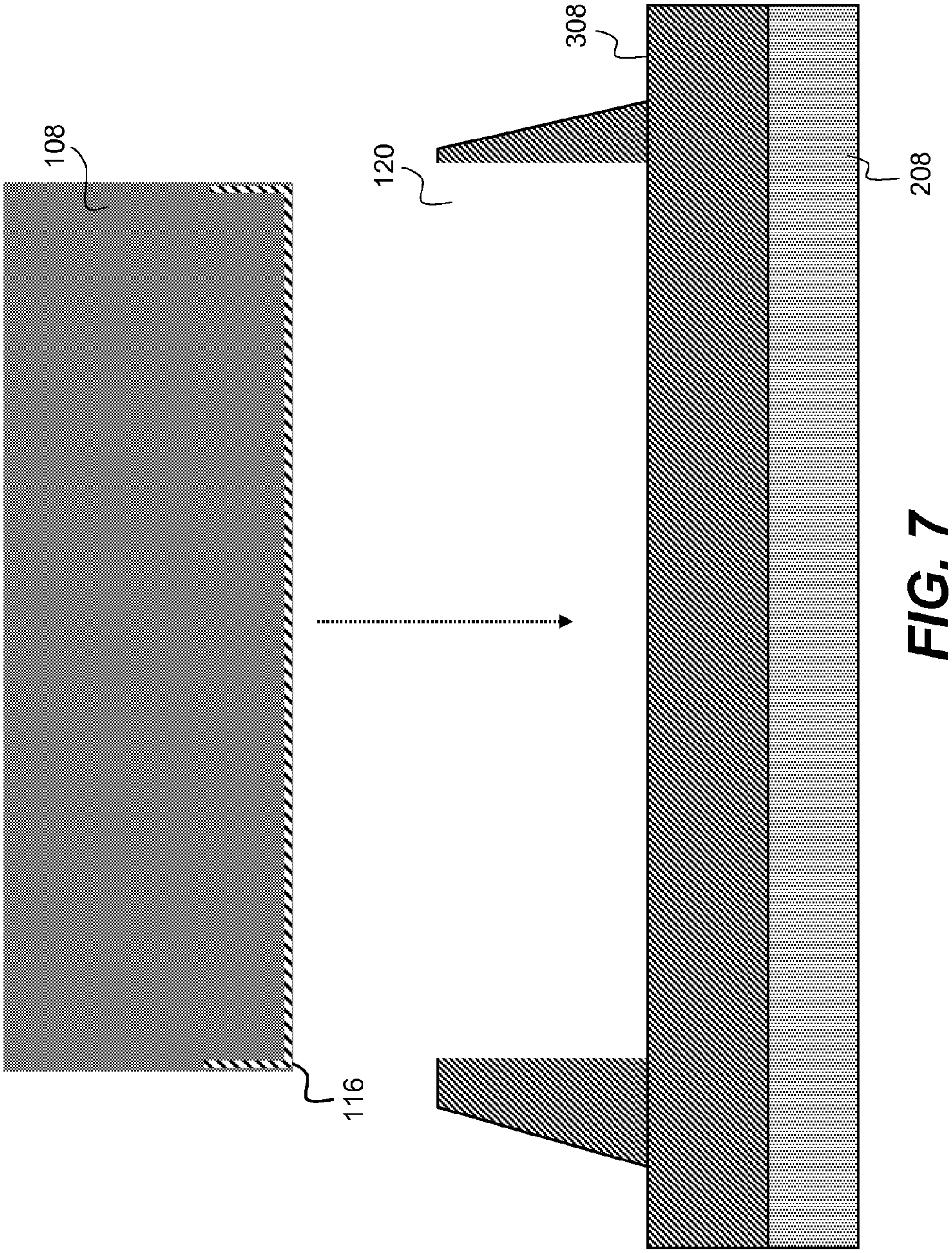
FIG. 7 is a schematic illustration of an large area of an imaged flexographic plate to be removed from the plate.
Figure 8:
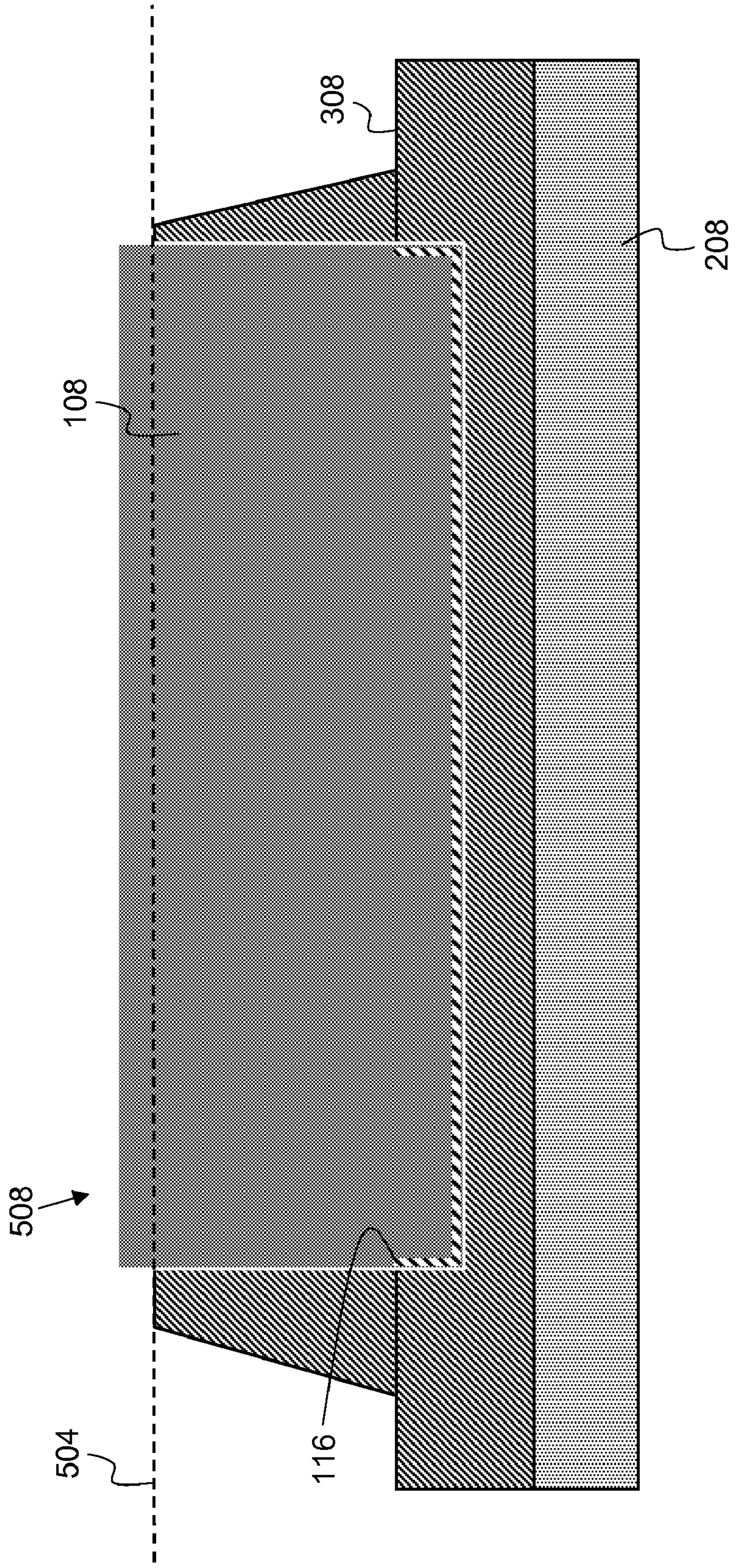
FIG. 8 is a schematic illustration of a patch placed in an imaged flexographic plate to be polished for further reimaging.
Figure 9:
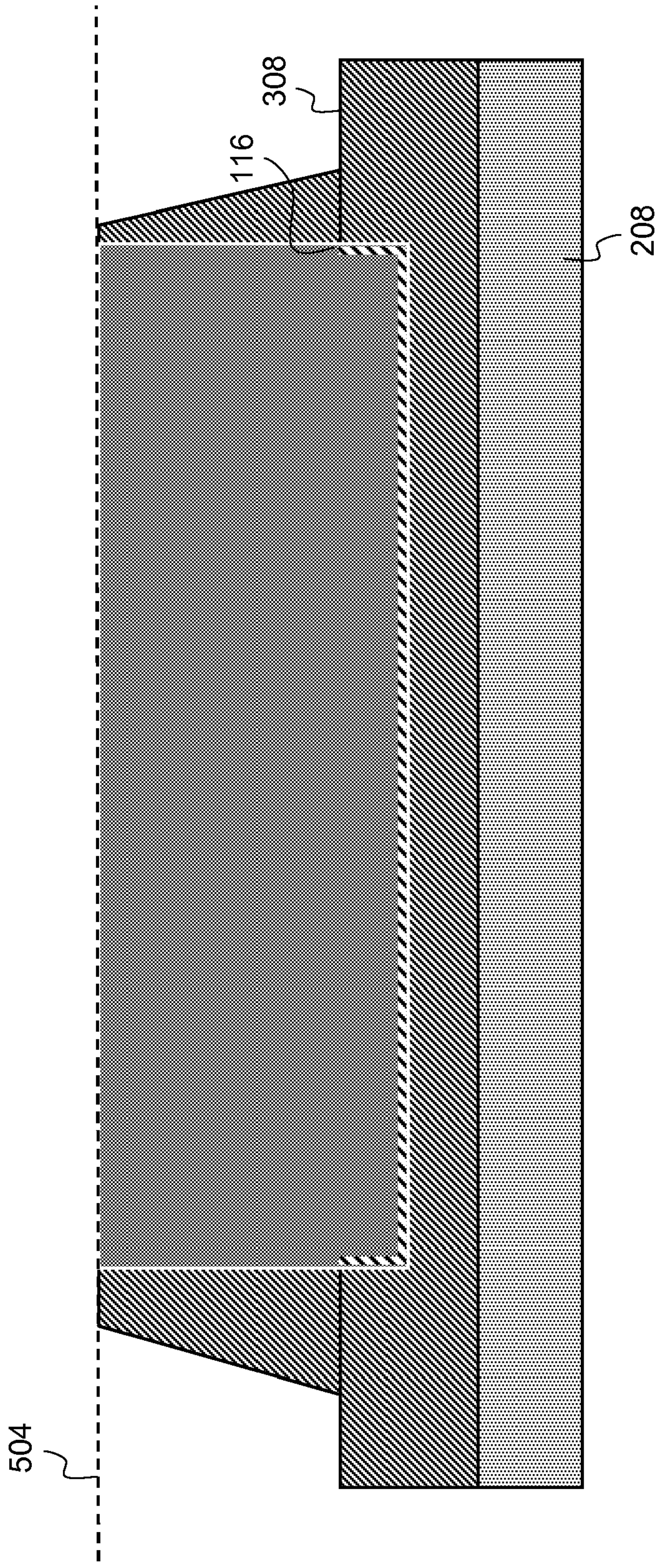
FIG. 9 is a schematic illustration of a patch placed in an imaged flexographic plate ready for further reimaging.

FIGS. 7-9 is a similar set of figures as are FIGS. 4-6, and show a larger area portion 108, to be imaged, inserted into a larger area 120 of plate 104.

The invention has been described in detail with particular reference to certain preferred embodiments thereof, but it will be understood that variations and modifications can be effected within the scope of the invention.

PARTS LIST

100 rotation drum with plate or sleeve
104 plate or sleeve
108 a plate portion to be glued and imaged
116 adhesive element
120 removed previously imaged area
200 plate or sleeve precursor
204 imaging (ablative) layer
208 support layer
304 imageable area (ink transfer area)
308 non-imageable area (no ink transfer area)
504 top plate surface
508 plate portion to be polished

The invention claimed is:

1. A method for correcting a previously imaged area on a flexographic plate comprising the steps of:
- removing said previously imaged area from said flexographic plate to create an opening in said flexographic plate;
- providing a portion of flexographic plate material which matches dimensions of said opening;
- adding adhesive material to said portion or to said opening or to said portion and to said opening;
- placing said portion in said opening;
- curing said adhesive material to permanently fix said portion to said flexographic plate;
- polishing a top of said portion to match a top surface of said flexographic plate;
- imaging said portion; and
- wherein said previously imaged portion is removed by applying laser power on said previously imaged portion.

2. The method according to claim 1 wherein said adhesive material is double sided.

3. The method according to claim 1 wherein said adhesive material is a dual component adhesive material.

4. The method according to claim 1 wherein said adhesive material is a heat activated material.

5. The method according to claim 4 wherein said heat activated material is activated by applying laser power.

6. The method according to claim 1 wherein a height of said flexographic plate is determined and said portion is polished to said height.

7. A method for correcting a previously imaged area on a flexographic plate comprising the steps of:
- removing said previously imaged area from said flexographic plate to create an opening in said flexographic plate;
- providing a portion of flexographic plate material which matches dimensions of said opening;
- adding adhesive material to said portion or to said opening or to said portion and to said opening;
- placing said portion in said opening;
- curing said adhesive material to permanently fix said portion to said flexographic plate;
- polishing a top of said portion to match a top surface of said flexographic plate;
- imaging said portion; and
- wherein said portion is cut from a non-imaged area of said flexographic plate.

8. A method for correcting a previously imaged area on a flexographic plate comprising the steps of:
- removing said previously imaged area from said flexographic plate to create an opening in said flexographic plate;
- providing a portion of flexographic plate material which matches dimensions of said opening;
- adding adhesive material to said portion or to said opening or to said portion and to said opening;
- placing said portion in said opening;
- curing said adhesive material to permanently fix said portion to said flexographic plate;
- polishing a top of said portion to match a top surface of said flexographic plate;
- imaging said portion; and
- wherein said portion is cut from a partially imaged area of said flexographic plate.

9. A method for correcting a previously imaged area on a flexographic plate comprising the steps of:
- removing said previously imaged area from said flexographic plate to create an opening in said flexographic plate;
- providing a portion of flexographic plate material which matches dimensions of said opening;
- adding adhesive material to said portion or to said opening or to said portion and to said opening;
- placing said portion in said opening;
- curing said adhesive material to permanently fix said portion to said flexographic plate;
- polishing a top of said portion to match a top surface of said flexographic plate;
- imaging said portion; and
- wherein said polish is performed by applying laser power.

10. A method for correcting a previously imaged area on a flexographic plate comprising the steps of:
- removing said previously imaged area from said flexographic plate to create an opening in said flexographic plate;
- cutting a portion of non-imaged flexographic plate which matches dimensions of said opening;
- adding adhesive material to said portion or to said opening or to said portion and to said opening;
- placing said portion in said opening;
- curing said adhesive material;
- determining a height of said flexographic plate;
- polishing a top of said portion to match the height of said flexographic plate.

11. The method according to claim 10 comprising the additional step of imaging said portion.

* * * * *